Patented July 23, 1929.

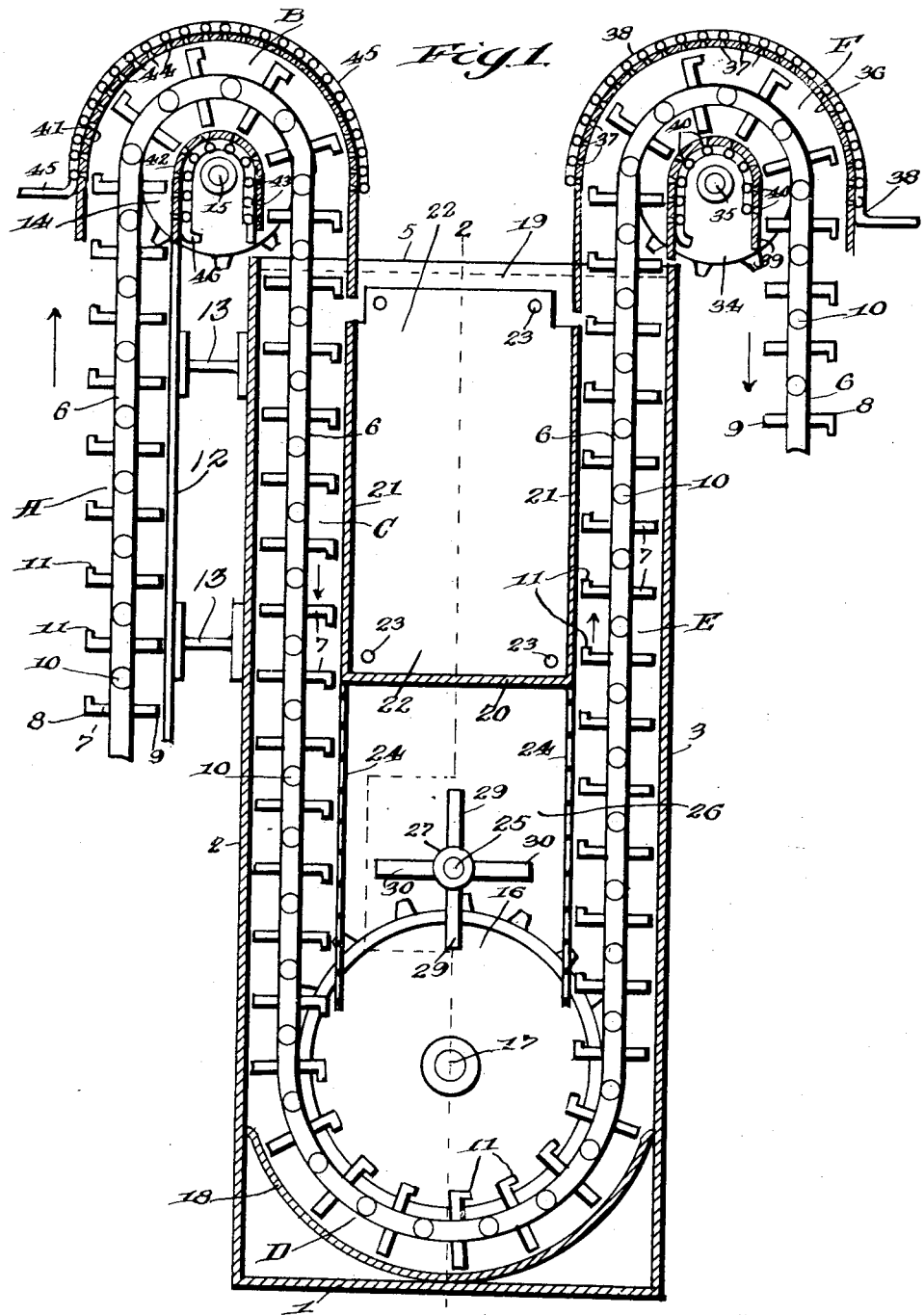

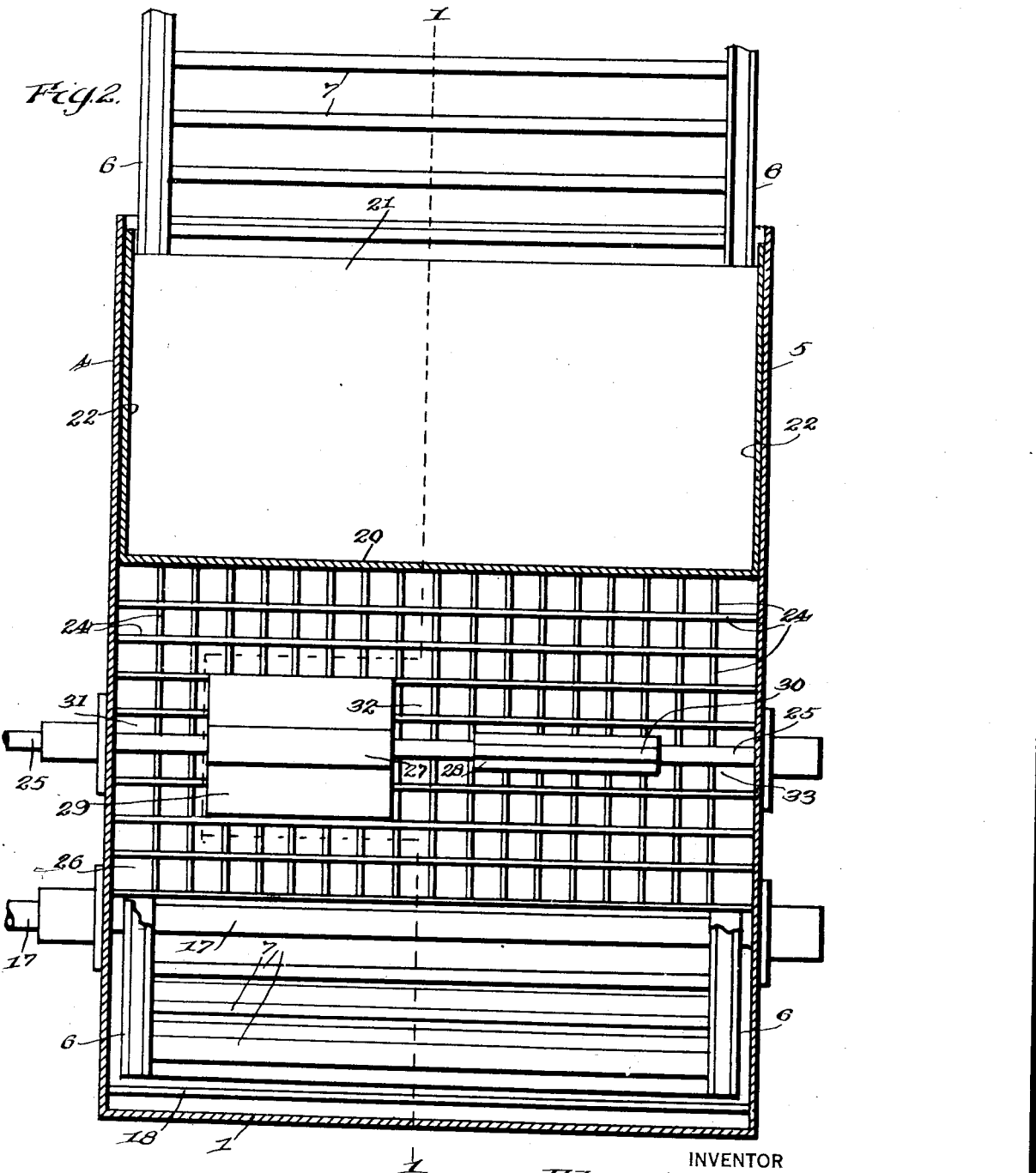

1,721,537

UNITED STATES PATENT OFFICE.

EDWARD A. WHITE, OF LEWISTON, IDAHO.

HYDRAULIC FRUIT-TREATING MACHINE AND METHOD.

Application filed April 6, 1927. Serial No. 181,445.

The object of this invention is to provide a method and mechanism for penetrating, liquefying and removing poison sediment from fruit and the invention is an improvement on my invention filed March 9, 1927, Serial No. 173,986.

In my former case, reliance was placed on immersion of the fruit in the solution and the hydrostatic head weight of the solution, together with the length of time of submergence, to not only penetrate but dissolve and remove the poison, any remaining residue being rinsed off.

In this treatment of fruit, it is necessary to obtain not only large capacity but also prompt and efficient action and as a slow movement of the fruit through the solution could not be effective without greatly enlarging the mechanism and adding materially to the cost thereof, I have addressed myself to this dual problem by applying hydraulic action to not only hasten penetration but also liquefaction and removal of the poison.

In accordance with my present invention, I can employ a solution tank of relatively greatly smaller dimensions and a consequently reduced length of travel of the carrier, but by hydraulically applying the solution to the fruit I quickly obtain sufficient penetration so that the resulting liquefaction takes place more quickly than before.

It is a feature of my invention, in the employment of an open tank for the solution, to restrict a portion of the body of the solution, or rather restrict the flow thereof, in such a manner that by maintaining the liquid in motion, I can concentrate and localize the flow thereof on the fruit with such an effective pressure engagement that instead of obtaining a penetrating action hydrostatically of a mere ounce or fraction thereof, to the square inch of fruit surface, I can now, hydraulically impose a pound or more of penetrating pressure per square inch, dependent upon the amount of energy expended in maintaining the solution in motion.

A further feature of my invention which is highly advantageous irrespective of the amount of sediment on the fruit, and which functions interdependently with my improved tank mechanism, although not always essential to complete and operative performance of the latter, consists of means for moving the fruit abreast of a series of fixed nozzles from which a liquid is discharged, and continuously changing the position of the fruit with respect to said nozzles in order to bring all portions of the areas of the fruit into range of said nozzles.

My invention has many other features which will be more fully described in connection with the accompanying drawings and which will be more particularly pointed out in and by the appended claims.

In the drawings:

Fig. 1, is a vertical sectional view on line 1—1 of Fig. 2, of an apparatus embodying the most improved form of my present invention.

Fig. 2, is a sectional view on line 2—2 of Fig. 1.

Like characters of reference designate similar parts throughout the different figures of the drawings.

As illustrated, I employ a tank having a bottom wall 1, side walls 2 and 3 and end walls 4 and 5, the top of the tank being open. This tank is adapted to contain the solution employed for dissolving the poison sediment and usually, this solution involves an acid content or ingredient, and in any event, it is of such a character that it will attack and dissolve the poison, the solution being of course selected for the particular residue to be removed. In this connection it may be stated that not only a difficult but also a delicate phase of this problem of removing sediment involves the controlling factor that a not too strong solution can be used without endangering the fruit, and my invention is addressed to the problem with a very complete knowledge of this fact.

Reverting now to the mechanism of my invention, I employ a carrier for the fruit which, as shown, consists of flexible chains 6, between which are disposed a series of fruit supporting boards 7, the chains 6 being suitably secured to the ends of said boards between the long edges 8 and 9, in any desirable manner, not shown. The chains 6 are illustrated as being jointed at 10, between the points of connection of said chains with the boards 7 so that when the chains are negotiating curved paths about guiding means or wheels, to be later described, the degree of convergence of the radially inward edges of the boards will be relatively reduced, this factor being related to the points of anchorage of the boards to the chains, as will presently appear. The boards 7, are preferably of a width, from edge 8 to edge 9, to support a single row of fruit, and the boards are elongated so that each row will be of considerable length to thereby increase the capacity of the mechanism. It is a feature of my invention to provide the boards with means for resisting dislodgement of the fruit integers therefrom, and as shown, I embody this feature in the form of an upstanding ledge 11 near the edges 8, of said boards. For convenience in the description of the operation, I will designate lap A, of the carrier, as the charging or loading lap since in practice, the fruit integers are disposed on the boards 7 from the left of Fig. 1, by some such mechanism as I have disclosed in the above identified case. It is during upward travel of lap A, that the ledges 11, perform their major function. At the rear of lap A, I may dispose a sheet like guard 12, mounted on brackets 13, to prevent the fruit from rolling off the carrier to the right of Fig. 1. I will designate portion or lap B, as a nozzle penetrating lap, the lap C, as the ingress lap, the lap D, the bight lap, the lap E as the egress lap, and the lap F, as the rinsing lap.

I provide means for guiding the carrier through its path of travel and as shown, said means includes wheels 14, mounted on shaft 15, for guiding the carrier through lap B and toward the tank. Bight wheels 16, mounted on shaft 17, are disposed near the bottom of the tank to guide the carrier through the bight lap D, and from the ingress to the egress laps C and E, respectively. I may employ a guard 18, for preventing dislodgement of the fruit while rounding wheels 16. However, this is not absolutely essential in all embodiments since the submerged fruit entities will, at this point in their travel, or at any point below the surface 19, seek to rise by reason of their buoyancy. Hence, the fruit will rise toward the shaft 17. The arrows show the direction of travel of the carrier. Power may be applied at any suitable point, not shown, to advance the carrier in the direction indicated by the arrows. As will be seen in Fig. 2, the boards 7 are substantially coextensive in length with respect to the side wall length except for the clearance allowed for the chains 6.

It is a feature of this invention, in combination with a tank that is open at the top, to partition off or form a current restrictive portion or chamber wherein an effective hydraulic action of water or solution can be initiated and sustained without causing more than a minimum of agitation of the solution above said chamber, which feature I will next describe in detail.

Means is provided which may be in the form of a partition 20, for dividing off the lower portion of the tank from the upper portion thereof. As shown, said partition is substantially horizontally disposed and in Fig. 1, it extends between the ingress and egress laps of the carrier, and as shown in Fig. 2, it extends toward the end walls 4 and 5, or in fact to said walls, except for suitable spaces at the corners to accommodate the chains. As shown in Fig. 1, the partition has upwardly extending portions 21, which extend alongside the ingress and egress laps C and E, respectively, and as these laps travel close to walls 2 and 3, it will be clear that the fruit integers cannot become dislodged because of these guards on opposite sides of said laps. The end walls 22, or the end projections, may be secured to the end walls 4 and 5, by means of rivets 23. Thus, a hollow structure is fixed in the tank which performs the function of providing ingress and egress travel of the carrier laps and also coacts therewith so that the agitation of the solution below partition 20, cannot be transmitted to areas above said partition. If, for instance, the currents should seek escape upwardly between the lowermost board 7, abreast of partition 20, its force would be vitiated before it had passed the next upper board by reason of the relatively close fit between the carrier laps and the walls of the tank and the walls 21. I provide downwardly extending open work extensions 24, projecting from the partition 20 to points near a level with the axis of shaft 17, or lower if desired. These extensions 24, not only function as guards to prevent dislodgement of the fruit from the boards while the latter are traversing the restricted chamber, but they also permit the sustained currents of solution to pass freely through and into engagement with the fruit as the latter is advanced in different directions. They also permit the currents abutting the side walls 4 and 5 to return in reverse directions with a minimum of resistance, as will presently appear. The extensions 24, may be secured to the end walls 4 and 5, in any suitable manner.

I will next describe the manner and means whereby I hydraulically cause the solution to impinge and penetrate and thereby hasten dissolution of the poison sediment on the fruit so that by a relatively short and speedy treatment thereof I can obtain results equal, and even better, than by a prolonged and thereby costly treatment.

A shaft 25, extends through the restricted area or chamber which I will designate as 26, and is journalled in the end walls, as will be seen by reference to Fig. 2. Rotary motion may be applied to shaft 25, by any desirable means in either direction but preferably constantly in one direction. It will be noted that this shaft is disposed substantially centrally between walls 2 and 3 and below partition 20. On this shaft 25 I dispose propeller means and in the most improved form of the invention I employ two propellers 27 and 28, each having two blades 29 and 30, respectively, although I do not wish to be limited to this particular arrangement. I also desirably dispose the propellers on shaft 25 so that the blades 29 and 30 will be in offset relation, as shown. One of the important features is that I space the propellers apart from each other and the walls 2 and 5, as indicated at 31, 32 and 33, so that when the propellers have driven the solution against one side wall say wall 2, for instance, these spaces will permit of back flow toward wall 3, and vice versa, thereby reducing wake voids as far as possible. The speed at which the propellers are driven, will govern the impingement or penerating pressure application which is applied to the fruit. At any rate, the surface pressure on the fruit, by this method and means, will be nearer pounds per square inch, than ounces per square inch, by reason of the fact that this penetrating pressure is hydraulically, rather than hydrostatically initiated and maintained.

Due to the fact that the fruit entities subjected to such current pressure are always submerged while passing through the current chamber 26, they will never be injuriously impacted against walls 2 or 3, or against boards 7 or grating 24, and yet the sustained pressure of the variant currents to which they will be subjected, will cause a most effective penetration of the hard poison sediment with which their surfaces are partially coated. These currents will roll and change the position of the fruit entities which are cushioned by reason of their submergence, thereby engaging all portions of the areas of the fruit, and a back current will be as effective as a propelled current in the performance of this function particularly in view of the fact that the currents are of a sustained nature. Thus in the short period of one minute, for instance, which may be said to be the time required for a row of fruit to pass through the current chamber 26, I can obtain penetration and dissolution of the poison sediment as effectively if not more so, than I could in ten minutes of subjection of the fruit in a solution that is quiescent and where dependence is placed upon hydrostatic head pressure to obtain penetration. It will now be clear that without strengthening the acid content of the solution, I increase efficiency and get the desired results in relatively less time and with a relatively smaller apparatus than heretofore has been known.

At this point it may be important to elucidate the stress laid on penetration of the poison sediment. This hardened sediment is of the nature of crystals and it is necessary to penetrate it before it can be dissolved. If the invention waited for dissolution, resulting from the sediment being immersed, the treatment would be greatly delayed. Hence, the importance of quick penetration, to hasten dissolution, so that the period of immersion can be reduced and the treatment shortened, with a greatly increased capacity.

It is a feature of this invention to rinse off any drippings of the solution that may be carried by the fruit after leaving the tank, and I will next describe this feature of the invention.

The lap F is guided by wheels 34, mounted on shaft 35, and after passing through the rinsing operation, the carrier may be guided to any point of deposition such as the drier, shown in my above identified case. About the periphery of lap F, is disposed a housing 36 provided with a series of nozzles 37 which are shown pointed radially inwardly toward the center of shaft 35. A supply pipe 38, connects with said nozzles and supplies clear rinsing water. A similar structure 39, which also functions as an inner guard for the fruit, is provided with a series of nozzles 40, which diverge radially outwardly from the center of shaft 35. Now it will be clear that as the carrier rounds laps F, the fruit entities are continually changing their position with respect to the direction of the streams of rinsing water that is discharged thereon, both by the outer and inner nozzles. Hence, every portion of the area of the fruit is exposed to thorough rinsing action. The identical arrangement is shown for the lap B, the outer and inner guard structures 41 and 42, the inner and outer series of nozzles 43 and 44, the supply pipes 45 and 46, delivering to said nozzles, being the same as just described. However, instead of clear water, I supply the nozzles 43 and 44 with the same solution which the tank contains. By this arrangement, I obtain a preliminary penetration of the poison on the fruit before the latter enters the tank, and in some cases where the amount of residue on the fruit is excessive, this preliminary penetration greatly assists the heretofore described operation in the tank, although it will be understood that this preliminary penetrating operation is not essential to the successful operation of my invention. However, it is interdependently related thereto for the reason that when it is employed, I can speed up the operation in the tank to an even greater rate than without this preliminary treatment.

It is believed that the invention will be fully understood from the foregoing description and while I have herein shown one specific form of my invention, I do not wish to be limited thereto except for such limitations as the claims may import.

I claim:

1. A means of quickly dissolving poison sediment from fruit comprising, a tank adapted to contain a relatively weak solvent solution for the poison sediment and having a carrier ingress and egress, a carrier for confining the integers to be treated to a prescribed path of travel, mechanism for guiding said carrier through said ingress and downwardly in said tank and thence outwardly through said egress, means for initiating sustained currents of the solvent to frictionally impinge against said fruit with sufficient pressure to cause penetration of the sediment on said fruit by said solvent to hasten liquefaction and removal of the poison sediment, and means for restricting movement of said sustained currents to portions below the top of said tank.

2. A means of dissolving sediment from fruit comprising, a substantially vertically disposed tank having an open top and adapted to contain a solvent solution for the poison sediment, a flexible carrier for the fruit integers to be treated, wheels for guiding said carrier downwardly and thence upwardly through the solution to immerse the integers, a current restricting partition extending horizontally across said tank below the top thereof and forming a restricting chamber in the lower portion of said tank, and propeller means in said restricted chamber for initiating and sustaining rapid currents of said solution against said integers to penetrate the sediment on said integers and thereby hasten liquefaction and removal thereof.

3. A means of dissolving sediment from fruit comprising, a substantially vertically disposed tank having an open top and adapted to contain a solvent solution for the poison sediment, a flexible carrier for the fruit integers to be treated, wheels for guiding said carrier downwardly and thence upwardly through said solution to immerse said integers, a current restricting partition extending substantially horizontally across said tank below the top thereof and forming a restricting chamber in the lower portion of said tank, propeller means in said restricted chamber for initiating and sustaining rapid currents of said solution against said integers to penetrate the sediment on said integers and thereby hasten liquefaction and removal thereof, and means coacting with said carrier for preventing dislodgement of said integers from said carrier and affording impingement of the integers by said currents.

4. A means of dissolving sediment from fruit comprising, a tank adapted to contain the solvent solution for the sediment, carrier mechanism for conveying the integers downwardly and thence upwardly through the solution to immerse the integers, a current restricting partition dividing off the lower portion of said tank into a restricted chamber, and a plurality of spaced propellers in said restricted chamber for setting up and sustaining variant currents of the solution against said integers to cause penetration and hasten liquefaction and removal of the sediment.

5. A means of dissolving poison sediment from fruit comprising, a solution tank having opposite walls, a fruit confining open carrier conveying fruit integers alongside said walls, means for directing currents of the solution against said integers and through said carrier and against said walls, and means for confining said currents to substantially horizontal lines of flow in opposite directions.

6. In combination, a fruit carrier, a wheel for guiding said carrier through a curved path of travel, and inner and outer guards for said carrier each having nozzles for directing a liquid onto the fruit in said carrier as the latter is guided by said wheel.

7. The herein-described method of quickly penetrating and dissolving poison sediment from the surface of whole fruit, which consists, in confining and advancing exposed fruit at a substantially uniform rate of speed and at a substantially prescribed path of travel through a relatively weak solution that is a solvent of the poison sediment thereby submerging and exposing all of said integers for a substantially uniform period of time, and in subjecting the submerged and confined fruit integers to forced impingement by the solution to hasten penetration and liquefaction and removal of the poison sediment before the solution can penetrate the fruit integers.

In testimony that I claim the foregoing as my own, I hereby affix my signature.

EDWARD A. WHITE.